United States Patent
Chen et al.

(10) Patent No.: US 12,450,670 B2
(45) Date of Patent: Oct. 21, 2025

(54) METHOD FOR DETERMINING MINING VALUE OF LEUCOGRANITE-HOSTED URANIUM DEPOSIT

(71) Applicant: BEIJING RESEARCH INSTITUTE OF URANIUM GEOLOGY, Beijing (CN)

(72) Inventors: Jinyong Chen, Beijing (CN); Ziying Li, Beijing (CN); Cheng Wang, Beijing (CN); Honghai Fan, Beijing (CN); Dawei Tang, Beijing (CN); Mingkuan Qin, Beijing (CN); Yuqi Cai, Beijing (CN); Debao He, Beijing (CN); Xiaoqian Xiu, Beijing (CN); Ruirui Geng, Beijing (CN); Donghuan Chen, Beijing (CN); Xu Chen, Beijing (CN)

(73) Assignee: BEIJING RESEARCH INSTITUTE OF URANIUM GEOLOGY, Beijing (CN)

( * ) Notice: Subject to any disclaimer, the term of this patent is extended or adjusted under 35 U.S.C. 154(b) by 0 days.

(21) Appl. No.: 17/922,843

(22) PCT Filed: Sep. 14, 2022

(86) PCT No.: PCT/CN2022/118821
§ 371 (c)(1),
(2) Date: Nov. 2, 2022

(87) PCT Pub. No.: WO2024/031778
PCT Pub. Date: Feb. 15, 2024

(65) Prior Publication Data
US 2024/0054574 A1 Feb. 15, 2024

(30) Foreign Application Priority Data
Aug. 11, 2022 (CN) .......................... 202210963435.0

(51) Int. Cl.
*G06Q 50/02* (2024.01)
*G01N 33/24* (2006.01)
*G06Q 10/0631* (2023.01)

(52) U.S. Cl.
CPC ............. *G06Q 50/02* (2013.01); *G01N 33/24* (2013.01); *G06Q 10/06315* (2013.01)

(58) Field of Classification Search
CPC ... G06Q 50/02; G06Q 10/06315; G01N 33/24
See application file for complete search history.

(56) References Cited

U.S. PATENT DOCUMENTS 4,491,411 A * 1/1985 Goldstein .......... G01N 21/4738
356/30

FOREIGN PATENT DOCUMENTS

| CN | 85102450 A | 1/1987 |
|---|---|---|
| CN | 104239664 A | 12/2014 |

(Continued)

OTHER PUBLICATIONS

Prof. Pei Rongfu, and Prof. Zhong Ziran, "Researchable Exploration and Exploration about Mineral Resource and Sustainable Development of Mining Industry by Lili", chinese Academy of Geological Sciences, Beijing, China, pp. 1-117 (Year: 2008).*

(Continued)

*Primary Examiner* — Michael J Dalbo
*Assistant Examiner* — Kaleria Knox
(74) *Attorney, Agent, or Firm* — Westman, Champlin & Koehler, P.A.

(57) ABSTRACT

A method for determining a mining value of a leucogranite-hosted uranium deposit, including: determining average uranium grade, uranium occurrence, average uranium recovery rate, and uranium stripping ratio of the leucogranite-hosted uranium deposit in an exploration region, wherein the average uranium recovery rate is a ratio of a uranium (Continued)

recovery amount after hydrometallurgy to a total uranium amount, and the uranium stripping ratio is a ratio of an amount of rock to be stripped to a uranium ore amount in a mining process; and determining the mining value of the leucogranite-hosted uranium deposit in the exploration region, wherein the mining value of the leucogranite-hosted uranium deposit is determined based on one or more of the average uranium grade, the uranium occurrence, the average uranium recovery rate, and the uranium stripping ratio.

11 Claims, 2 Drawing Sheets

(56) References Cited

FOREIGN PATENT DOCUMENTS

| CN | 105956928 | A |   | 9/2016 |            |
|----|-----------|---|---|--------|------------|
| CN | 112446602 | A |   | 3/2021 |            |
| CN | 112763568 | A | * | 5/2021 | G01N 27/626 |
| CN | 112774854 | A | * | 5/2021 | B03B 7/00  |
| CN | 112958270 | A | * | 6/2021 | B03B 9/00  |
| CN | 114325867 | A |   | 4/2022 |            |

OTHER PUBLICATIONS

Lockey "Uranium Mining in Virginia: Scientific, Technical, Environmental, Human Health and Safety, and Regulatory Aspects of Uranium Mining and Processing in Virginia" Committee on Uranium Mining in Virginia; Committee on Earth Resources; National Research Council ISBN 978-0-309-22087-3, pp. 1-342 (Year: 2012).*

Noble "Regional exploration for channel and playa uranium deposits in Western Australia sung groundwater.", pp. 1956-1974; www.elsevier.com/locate/apgeochem (Year: 2011).*

"Uranium and thorium in granitic rocks of northeastern Washington and northern Idaho, with comments on uranium resource potential" J. Thomas Nash, pp. 1-35; Open-File Report 79-233 (Year: 1979).*

An example of uraniferous leucogranites in the Rossing South-West deposit, Namibia Simon H. Shanyengana, pp. 1-17; Journal of African Earth Sciences vol. 162, Feb. 2020, 103698 (Year: 2020).*

Wyllie "Rock Slope Engineering". Civil and Mining 4th Edition, based on the third edition by E Hoek and J Bray; pp. 1-425 (Year: 1974).*

Charles D. Masters " A Proposed U.S. Resource Classification System", pp. 1-12; United States Department of the Interior Geological Survey. (Year: 1979).*

Huang, Shi-Xin CN112763568A, pp. 1-7; May 7, 2021 (Year: 2021).*

First Office Action, including Search Report, for Chinese Patent Application No. 202210963435.0, dated Sep. 28, 2022, 14 pages.

International Search Report (including English translation) and Written Opinion for International Application No. PCT/CN2022/118821, dated Dec. 19, 2022, 8 pages.

Li Li, "Reasonable Exploration and Exploitation about Mineral Resource and Sustainable Development of Mining Industry," A Dissertation submitted to Chinese Academy of Geological Sciences for Doctor Degree, 3rd Issue, Mar. 15, 2009.

* cited by examiner

METHOD FOR DETERMINING MINING VALUE OF LEUCOGRANITE-HOSTED URANIUM DEPOSIT

CROSS REFERENCE TO RELATED APPLICATION(S)

This application is a Section 371 National Stage Application of International Application No. PCT/CN2022/118821, filed on Sep. 14, 2022, entitled "METHOD FOR DETERMINING MINING VALUE OF LEUCOGRANITE-HOSTED URANIUM DEPOSIT", which claims priority to Chinese Application No. 202210963435.0, filed on Aug. 11, 2022, the contents of which are incorporated herein by reference in their entireties.

TECHNICAL FIELD

The present disclosure relates to a method for analyzing a geological body by means of physical and chemical properties of the geological body, and in particular, to a method for determining a mining value of a leucogranite-hosted uranium deposit.

BACKGROUND

After a uranium resource is actually explored, it is necessary to evaluate a mining value of the uranium resource to avoid a waste of time, cost, and energy caused by blind mining. A leucogranite-hosted uranium deposit is one of the main directions of uranium exploration in the art, and a method that may relatively accurately evaluate a mining value of a leucogranite-hosted uranium deposit has not been proposed in the related art.

SUMMARY

In view of the above problem, according to the present disclosure, there is provided a method for determining a mining value of a leucogranite-hosted uranium deposit to overcome the above problem or at least partially solve the above problem.

According to the embodiments of the present disclosure provide a method for determining a mining value of a leucogranite-hosted uranium deposit, including: determining average uranium grade, uranium occurrence, average uranium recovery rate, and uranium stripping ratio of a leucogranite-hosted uranium deposit in an exploration region, wherein the average uranium recovery rate is a ratio of a uranium recovery amount after hydrometallurgy to a total uranium amount, and the uranium stripping ratio is a ratio of an amount of rock to be stripped to a uranium ore amount in a mining process; and determining a mining value of the leucogranite-hosted uranium deposit in the exploration region, wherein the mining value of the leucogranite-hosted uranium deposit is determined based on one or more of the average uranium grade, the uranium occurrence, the average uranium recovery rate, and the uranium stripping ratio.

DETAILED DESCRIPTION OF EMBODIMENTS

In order to make the objects, technical solutions and advantages of the present disclosure clearer, the technical solutions of the present disclosure will be described clearly and completely below with reference to the accompanying drawings of the embodiments of the present disclosure. Obviously, the described embodiment is one embodiment of the present disclosure, but not all embodiments. Based on the described embodiment of the present disclosure, all other embodiments obtained by those of ordinary skill in the art without creative effort fall within the protection scope of the present disclosure.

It should be noted that, unless otherwise defined, the technical terms or scientific terms used in the present disclosure have the general meanings understood by those with ordinary skills in the art. If descriptions such as "first" and "second" are involved in the whole text, the descriptions such as "first" and "second" are only used to distinguish similar objects, and should not be construed as indicating or implying their relative importance, sequence, etc. or impliedly indicating the number of the represented technical feature. It should be understood that the data described by "first", "second", etc. may be interchanged under appropriate circumstances. If "and/or" appears in the whole text, it means that it includes three parallel solutions. Taking "A and/or B" as an example, it includes solution A, solution B, or solution that A and B are satisfied at the same time.

Figure 1:
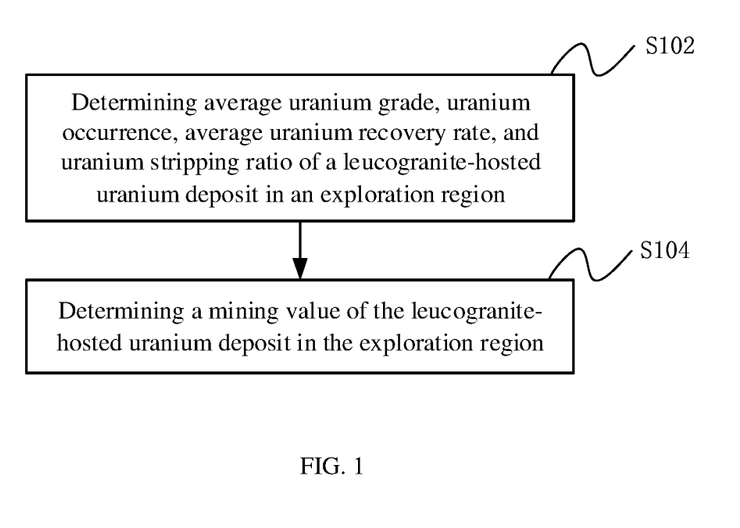
FIG. 1 is a flow chart of a method for determining a mining value of a leucogranite-hosted uranium deposit according to an embodiment of the present disclosure.

According to the embodiments of the present disclosure, there is provided a method for determining a mining value of a leucogranite-hosted uranium deposit, referring to FIG. 1, including:

Step S102: determining average uranium grade, uranium occurrence, average uranium recovery rate, and uranium stripping ratio of the leucogranite-hosted uranium deposit in an exploration region.

Step S104: determining the mining value of the leucogranite-hosted uranium deposit in the exploration region. Specifically, in step S104 the mining value of the leucogranite-hosted uranium deposit may be determined based on one or more of the average uranium grade, the uranium occurrence, the average uranium recovery rate, and the uranium stripping ratio determined in step S102.

An exploration region may refer to a region where a leucogranite-hosted uranium deposit distribution exists determined by those skilled in the art in any suitable manner.

The average uranium grade refers to an average value of uranium grade at different positions of a leucogranite-hosted uranium deposit in an exploration region, and it may reflect a uranium content level of a leucogranite-hosted uranium deposit in an entire study region on the whole. The uranium grade here mainly refers to a content of $U_3O_8$. Contents of $U_3O_8$ at different positions of a leucogranite-hosted uranium deposit may be determined by geochemical analysis and other methods to further determine the average uranium grade.

The uranium occurrence refers to a specific existence form of uranium in a leucogranite-hosted uranium deposit. Several uranium occurrences mainly exist in a leucogranite-hosted uranium deposit, such as uraninite, uranophane, betafite, and brannerite. The uranium occurrence may be determined by rock and mineral identification, radiography, electron probe analysis and other detection methods.

In the mining process of a leucogranite-hosted uranium deposit, it is usually necessary to extract uranium by hydrometallurgy. During hydrometallurgy, uranium is usually leached by an acid solution, and then uranium is extracted, concentrated and purified. During hydrometallurgy, it is usually difficult to completely recover uranium in a uranium deposit, but only a certain proportion of uranium may be recovered. The average uranium recovery rate is used to describe an average recovery rate of a leucogranite-hosted uranium deposit during hydrometallurgy in an exploration region. Specifically, average uranium recovery rate is defined as a ratio of a uranium recovery amount and a total uranium amount during hydrometallurgy. It is understood that in the present disclosure average uranium recovery rate is used to determine a mining value of a leucogranite-hosted uranium deposit. That is, average uranium recovery rate needs to be determined before an actual mining. Therefore, average uranium recovery rate needs to be determined by sampling tests. For example, those skilled in the art may determine a plurality of uranium recovery rates by sampling and a plurality of sets of hydrometallurgical tests, so as to further determine average uranium recovery rate.

In the actual mining process, other rock needs to be stripped so that uranium ore is retained and then a subsequent hydrometallurgy is performed to the uranium ore. The rock that needs to be stripped may include waste rock, etc., and may also include low grade uranium ore having no hydrometallurgical value. Correspondingly, the uranium ore here may specifically refer to uranium ore having a hydrometallurgical value, i.e., uranium ore having a relatively high uranium grade. Those skilled in the art may specifically distinguish the rock that needs to be stripped and the uranium ore according to the actual mining requirements and the relevant mining standards in the art, which is not limited here. A total mass of the rock that needs to be stripped is an amount of rock to be stripped described in the present disclosure, a total mass of the uranium ore is a uranium ore amount described in the present disclosure, and uranium stripping ratio is a ratio of an amount of rock to be stripped to a uranium ore amount.

Four indicators proposed in the present disclosure, such as average uranium grade, uranium occurrence, average uranium recovery rate and uranium stripping ratio, may reflect a mining value of a leucogranite-hosted uranium deposit to a certain extent.

Specifically, the average uranium grade characterizes an average level of a uranium content in a leucogranite-hosted uranium deposit in an exploration region, the average uranium recovery rate characterizes an efficiency of hydrometallurgical uranium recovery, and the uranium stripping ratio characterizes an efficiency of collecting uranium ore. These indicators may be used to evaluate a cost performance of mining, so as to further determine a mining value.

The uranium occurrence is related to the hydrometallurgy difficulty of uranium. Uranium in some uranium occurrence may be difficult to be recovered by hydrometallurgy under the current technical conditions, while uranium in other uranium occurrence may be relatively easily recovered by hydrometallurgy. Therefore, a mining feasibility may be evaluated with the help of a determined uranium occurrence and the current technical conditions, so as to further determine a mining value.

On this basis, in step S104, those skilled in the art may specifically select one or more of the above indicators to determine a mining value of a leucogranite-hosted uranium deposit according to the actual situations, such as mining demand, mining budget, mining environment, and mining technical reserve. Determining a mining value may include determining whether a leucogranite-hosted uranium deposit has a mining value, determining a size of the mining value of the leucogranite-hosted uranium deposit, and determining a mining value of a leucogranite-hosted uranium deposit compared with a leucogranite-hosted uranium deposit in another exploration region, etc.

With the method provided in the embodiments of the present disclosure, a mining value of a leucogranite-hosted uranium deposit may be relatively accurately and intuitively evaluated, thereby avoiding a waste of time, cost and energy caused by blind mining.

Several specific rules for determining a mining value based on the above indicators will be described below.

In some embodiments, when a mining value of a leucogranite-hosted uranium deposit is determined in an exploration region, if it is determined that the average uranium grade is less than or equal to a first preset value, it is determined that the leucogranite-hosted uranium deposit has no mining value. As described above, the average uranium grade reflects an average uranium content level of a leucogranite-hosted uranium deposit. If the average uranium grade is less than the first preset value, it means that the average uranium content level of the leucogranite-hosted uranium deposit in the exploration region is relatively low. At this time, it may be directly considered that the leucogranite-hosted uranium deposit has no mining value without considering other indicators. The first preset value here may be determined by those skilled in the art according to the specific mining requirements and mining budget. As an example, the first preset value may be set to be 100 ppm.

In some embodiments, if it is determined that the average uranium grade of the leucogranite-hosted uranium deposit is greater than the first preset value, but at least one of the following is also determined: a proportion of a uranium whose uranium occurrence is betafite and brannerite is greater than a second preset value, the average uranium recovery rate being less than or equal to a third preset value, and the uranium stripping ratio being greater than a fourth preset value, it is determined that the leucogranite-hosted uranium deposit currently has no mining value but may be used as a reserve resource.

Different from the above description of having no mining value, what is determined in this embodiment is that the leucogranite-hosted uranium deposit currently has no mining value, rather than absolutely having no mining value. The average uranium grade of the leucogranite-hosted uranium deposit has reached the first preset value, but due to limitation of other factors, the cost of mining is high and is not economical, and therefore, it may only be considered as a reserve resource. When the conditions change in the future, such as technological development, technological innovation, and resource shortage, the leucogranite-hosted uranium deposit may have a mining value.

Specifically, compared with uranium whose uranium occurrence is uraninite and uranophane, uranium whose uranium occurrence is betafite and brannerite is relatively difficult to be recovered by hydrometallurgy, especially in the current technical conditions. If it is determined that a proportion of uranium whose uranium occurrence is betafite and brannerite in the leucogranite-hosted uranium deposit is greater than the second preset value, it means that the uranium occurrence of most uranium in the leucogranite-hosted uranium deposit are betafite and brannerite, and hydrometallurgy is relatively difficult. In this case, even if the average uranium grade of the leucogranite-hosted uranium deposit is greater than the first preset value, it may only be used as a reserve resource due to a poor economic efficiency of mining. The second preset value here may be determined by those skilled in the art as required. As an example, the second preset value may be 60%.

The average uranium recovery rate and the uranium stripping ratio characterize the efficiency of hydrometallurgy and the efficiency of uranium ore collection, respectively. If the average uranium recovery rate is less than or equal to a third preset value, it means that the efficiency of hydrometallurgy is low, and the cost performance of mining the leucogranite-hosted uranium deposit is low. Therefore, it is considered that it has no mining value. The third preset value may be determined by those skilled in the art based on a general recovery rate, mining cost, etc. during hydrometallurgy in the current technical conditions. As an example, the third preset value may be set to be 75%. Likewise, if the uranium stripping ratio is greater than a fourth preset value, it means that the efficiency of uranium ore collection is low. Therefore, it is also considered that it has no mining value. The fourth preset value may be determined by those skilled in the art based on a stripping cost in the current technical conditions. As an example, the fourth preset value may be 5.

The leucogranite-hosted uranium deposit determined as a reserve resource in this embodiment may have a mining value under certain circumstances. For example, if uranium in betafite and brannerite may be leached, the efficiency of hydrometallurgical is substantially improved, the cost thereof is substantially reduced, and the cost of uranium ore collection is greatly reduced due to technological innovation, some leucogranite-hosted uranium deposits determined as reserve resources may also have a mining value.

Figure 2:
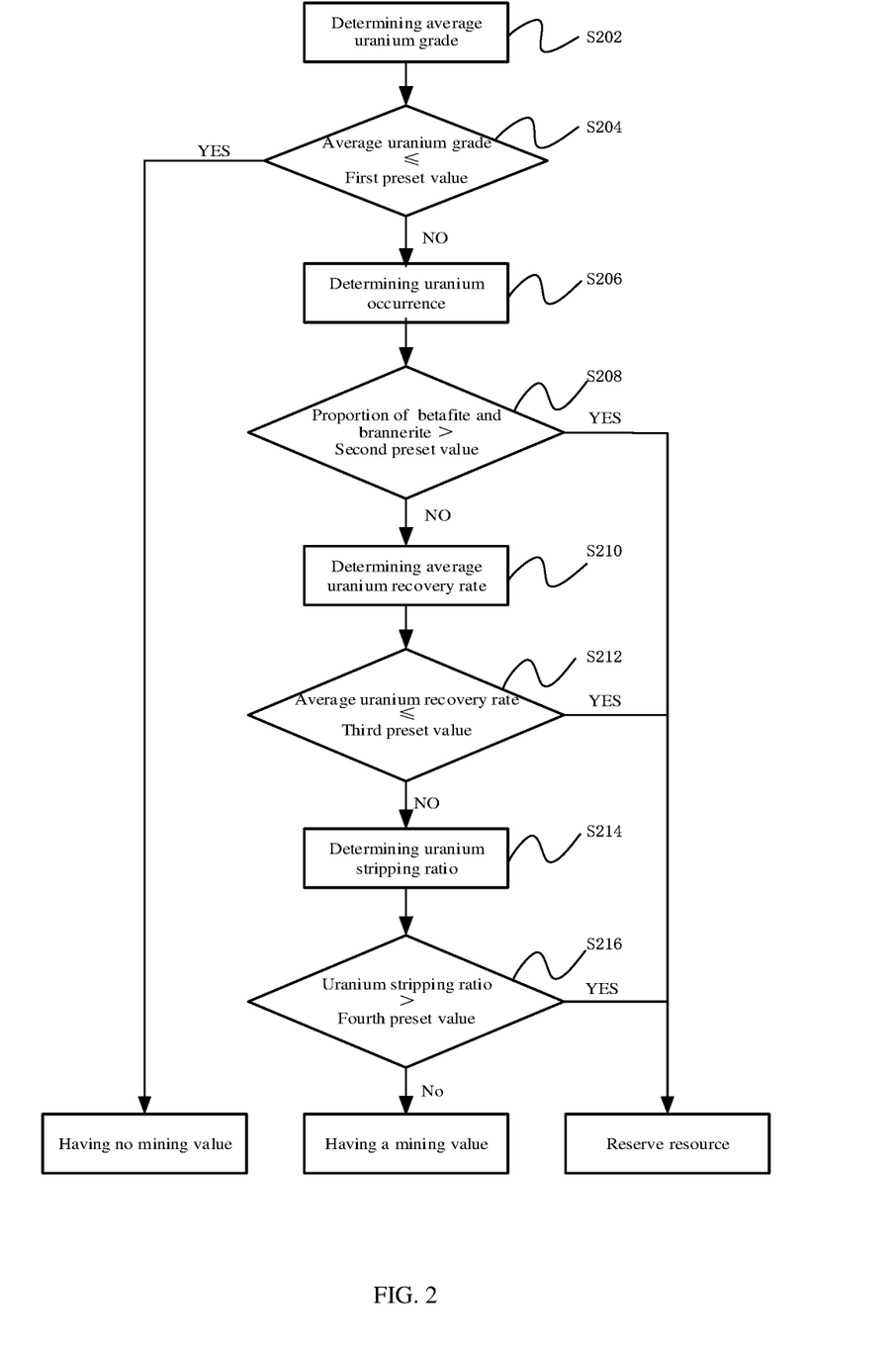
FIG. 2 is a flow chart of a method for determining a mining value of a leucogranite-hosted uranium deposit according to another embodiment of the present disclosure.

In some embodiments, the average uranium grade, the uranium occurrence, the average uranium recovery rate, and the uranium stripping ratio may be determined in sequence. In such an embodiment, a mining value may be determined once after one indicator is determined.

Specifically, referring to FIG. 2, the average uranium grade may be determined first in step S202, and then in step S204, it is determined whether the average uranium grade is less than or equal to the first preset value. If yes, it is directly considered that it has no mining value, and no subsequent step is needed. If not, the uranium occurrence continues to be determined in step S206, and it is determined in step S208 whether a proportion of uranium whose uranium occurrence is betafite and brannerite is greater than the second preset value. If yes, it is directly determined as a reserve resource, and no subsequent step is needed. If not, the average uranium recovery rate continues to be determined in step S210, and it is determined in step S212 whether the average uranium recovery rate is less than or equal to the third preset value. If yes, it is directly determined as a reserve resource, and no subsequent step is needed. If not, the uranium stripping ratio is determined in step S214, and in step S216, it is determined whether the uranium stripping ratio is greater than the fourth preset value. If yes, it is determined as a reserve resource. If not, it is determined to have a mining value.

In this embodiment, in some cases, only some indicators may be determined without other indicators being determined, thereby saving costs and improving efficiency. In some other embodiments, the sequence described above may also be changed, but it should be noted that as a premise that a reserve resource needs to meet is that the average uranium grade is greater than the first preset value, when the sequence is adjusted, it is still necessary to ensure that the uranium grade is first determined, and then other indicators are determined.

In some embodiments, if the following conditions are satisfied, it may be determined that the leucogranite-hosted uranium deposit has a mining value: the average uranium grade being greater than the first preset value, a proportion of a uranium whose uranium occurrence is uraninite and uranophane is greater than the second preset value, the average uranium recovery rate being greater than the third preset value, and the uranium stripping ratio being less than or equal to the fourth preset value.

In some embodiments, on the basis of determining that the leucogranite-hosted uranium deposit in the exploration region has a mining value, a size of the mining value thereof may be further determined. The size of the mining value may be determined with the help of one or more of the average uranium grade, the average uranium recovery rate, and the uranium stripping ratio. Specifically, the size of the mining value is in proportion to the average uranium grade and the average uranium recovery rate, and is in inverse proportion to the uranium stripping ratio. It may be understood that it helps to plan a mining solution more reasonably to further determine the size of the mining value, and in the case that a plurality of leucogranite-hosted uranium deposits having a mining value exist at the same time, the mining sequence and the allocation of mining costs may be further planned based on the size of the mining value.

Exemplarily, in some embodiments, the mining value may be divided into two grades, ordinary grade and high grade, based on the size of the mining value of the leucogranite-hosted uranium deposit. Specifically, on the basis that it is determined that the leucogranite-hosted uranium deposit has a mining value if the conditions, the average uranium grade being greater than or equal to 300 ppm, the uranium stripping ratio being less than or equal to 2.5, and the hydrometallurgical recovery rate being greater than 85%, are satisfied at the same time, the mining value is considered to be of a high grade. If the above conditions are not satisfied, but the condition of having a mining value is satisfied, the mining value is considered to be of an ordinary grade. Those skilled in the art may also divide the mining value into more grades to distinguish the mining value of the leucogranite-hosted uranium deposit more detailedly.

In some embodiments, the uranium occurrence may also be used to determine the size of the mining value. For example, on the basis that a proportion of uranium in the occurrence of uraninite and uranophane is greater than the second preset value, the greater the proportion is, the greater the mining value will be.

In some embodiments, on the basis of determining that the leucogranite-hosted uranium deposit has a mining value, a degree of deviation between the values of the above indicators and the first preset value, the third preset value as well as the fourth preset value used for determining whether it has a mining value may be further used to quantitatively reflect the size of the mining value.

In some embodiments, in addition to the above indicators, the average niobium content and/or the average tantalum content of the leucogranite-hosted uranium deposit in the exploration region may be further determined. The specific method for determining the average niobium content and the average tantalum content may refer to the method for determining the average uranium grade, which is not repeated here.

Correspondingly, when a mining value of the leucogranite-hosted uranium deposit is determined in the exploration region, if it is determined that the leucogranite-hosted uranium deposit has a mining value, and the average niobium content and/or the average tantalum content is greater than a fifth preset value, it is determined that the niobium and/or tantalum in the leucogranite-hosted uranium deposit has a value for mining as an associated resource. The niobium and/or tantalum may be mined together with the uranium mining, so as to maximize the utilization of resources.

Further, in the current technical conditions, it is difficult to separate uranium from niobium and tantalum in betafite and brannerite. Therefore, if the average niobium content and/or the average tantalum content is greater than the fifth preset value, and a proportion of a uranium whose uranium occurrence is uraninite and uranophane is greater than the second preset value, it may be determined that the uranium, the niobium and the tantalum in the leucogranite-hosted uranium deposit currently have no mining value and may only be used as reserve resources.

In some embodiments, when the average uranium grade is determined, a plurality of first sampling point locations may be set in the exploration region. The number of the first sampling point locations may be related to the scale of the leucogranite-hosted uranium deposit. Specifically, the larger the scale of the leucogranite-hosted uranium deposit is, the more the number of first sampling point locations that need to be set, so as to ensure that the determined average uranium grade may more accurately reflect the uranium content level in the leucogranite-hosted uranium deposit. The plurality of first sampling point locations may have the same spacing or may have different spacings, which is not limited here.

After the plurality of first sampling point locations are determined, the uranium grade at each first sampling point location may be determined respectively, and the average value of the uranium grade at the plurality of first sampling point locations may be determined as the average uranium grade.

Exemplarily, a mineralized core sample may be collected at each first sampling point location, the collected samples are subjected to a non-contamination crushing processing to 200 mesh, and then a geochemical analysis method is used to determine a $U_3O_8$ content at each sampling point location, i.e., the uranium grade, and then the average value is calculated as the average uranium grade. The geochemical analysis may be performed with reference to the relevant detection standards in the art, which is not repeated here.

In some embodiments, as described above, it is also necessary to determine the average niobium content and the average tantalum content. In such embodiments, when a geochemical analysis is performed to determine the uranium grade at the plurality of first sampling point locations, the niobium content and the tantalum content may be determined together, so as to further determine the average niobium content and the average tantalum content.

In some embodiments, when the uranium occurrence is determined, a plurality of second sampling point locations may be set in the exploration region, and the number of the second sampling point locations is related to the scale of the leucogranite-hosted uranium deposit. Then, the uranium occurrence at each second sampling point location is determined respectively, and a proportion of a uranium in each uranium occurrence is determined based on a ratio of the number of the second sampling point locations corresponding to each uranium occurrence to a total number of the second sampling point locations.

In some embodiments, the quantities of the first sampling point locations and the second sampling point locations are both related to the size of the leucogranite-hosted uranium deposit, but the number of the second sampling point locations may be less than the number of the first sampling point locations. For example, for a leucogranite-hosted uranium deposit having a uranium resource amount of between 100-1000 t, 20 second sampling point locations may be set, for a leucogranite-hosted uranium deposit having a uranium resource amount between 1000-3000 t, 30 second sampling point locations may be set, for a leucogranite-hosted uranium deposits having a uranium resource amount of between 3000-10000 t, 50 second sampling point locations may be set, and for a leucogranite-hosted uranium deposit having a uranium resource amount of more than 10000 t, more than 100 second sampling point locations may be set. Preferably, these second sampling point locations need to be evenly distributed in different positions of the leucogranite-hosted uranium deposit.

After the second sampling point locations are determined, samples may be collected at the second sampling point locations, and the uranium occurrence at each second sampling point location may be determined by means of rock and mineral identification, radiography, electron probe analysis, etc., so as to further calculate the proportion of uranium in each uranium occurrence. For example, it is assumed that 50 second sampling point locations are set, and the uranium occurrence at 36 second sampling point locations are uraninite or uranophane, the proportion of uranium whose uranium occurrence is uraninite and uranophane is 72%.

In some embodiments, when the uranium recovery rate is determined, a plurality of sets of core samples may be collected in the exploration region. A total uranium amount of each set of the core samples is determined based on a weight and a uranium grade of each set of the core samples respectively, and a uranium recovery amount of each set of the core samples is determined by performing hydrometallurgy to each set of the core samples respectively to calculate a uranium recovery rate of each set of the core samples. Further, an average value of uranium recovery rates of the plurality of sets of core samples is determined as the average uranium recovery rate.

In the process of collecting a plurality of sets of core samples, a large number of core samples may be collected at one location, and then roughly divided into a plurality of sets equally according to weight, so as to improve sampling efficiency and save costs. In some embodiments, a plurality of sets of core samples may also be collected at different locations in the exploration region, so that the plurality of sets of core samples may better reflect an overall uranium recovery rate of the leucogranite-hosted uranium deposit in the exploration region.

For each set of core samples collected, the total uranium content may be first calculated. Specifically, the uranium grade of this set of core samples may be multiplied by the weight thereof to determine the total uranium content, then hydrometallurgy is performed to this set of core samples, and the weight of the finally collected uranium is determined as the uranium recovery amount. The specific steps during hydrometallurgy may refer to relevant technical standards in the art. As an example, hydrometallurgy usually includes ore crushing—acid stirring leaching—coarse sand separation—ion exchange—solvent extraction—uranium concentrate precipitation—drying calcination, etc., to finally obtain $U_3O_8$.

In some embodiments, when the uranium stripping ratio is determined, a mining region in the exploration region may be first determined, and then a uranium ore volume and a surrounding rock volume are determined in the mining region. Specifically, the surrounding rock volume is determined based on a difference value between a volume of the mining region and the uranium ore volume. Then, a uranium ore amount is determined based on the uranium ore volume and a uranium ore density, and the amount of rock to be stripped is determined based on the surrounding rock volume and a surrounding rock density, so as to calculate the uranium stripping ratio.

The mining region refers to a working range in the actual mining process. Generally, the distribution range of the mining region is larger than the actual distribution range of the leucogranite-hosted uranium deposit to ensure the safety of mining. Those skilled in the art may determine the mining region by using a method for determining a mining region in the relevant technology, which is not limited here. After the mining region is determined, the uranium ore volume and the surrounding rock volume may be determined. Then, a product of the uranium ore volume and the uranium ore density is used as the uranium ore amount, and a product of the surrounding rock volume and the surrounding rock density is used as the amount of rock to be stripped. The uranium ore volume may be determined based on relevant data in the preliminary exploration process, for example, based on geological exploration profiles, drilling data, radioactivity values, etc., which is not limited here. The uranium ore density and the surrounding rock density may be determined by using standard values in the relevant technical materials in the art. For example, the uranium ore density may be 2.75 g/cm$^3$, and the surrounding rock density may be 2.5 g/cm$^3$. Alternatively, some uranium ore samples and surrounding rock samples may also be collected to determine the densities thereof, which is not limited here.

In some embodiments, the determining a mining region in the exploration region includes: determining a depth of the mining region based on a deposit depth of the leucogranite-hosted uranium deposit; determining a bottom boundary of the mining region based on a deposit width of the leucogranite-hosted uranium deposit; and determining a slope angle of the mining region based on the depth of the mining region and a mechanical property of the leucogranite-hosted uranium deposit.

A slope is mainly set to ensure the safety of an open-pit mining. The angle of the slope is mainly determined based on the depth of the mining region and the mechanical property of the leucogranite-hosted uranium deposit. A mechanical property mainly refers to the hardness of the leucogranite. Exemplarily, if the hardness of leucogranite is 6-7, when the mining depth is within 100 m, the slope angle is between 43° and 50°, when the depth is 100 m-200 m, the slope angle is between 41° and 58°, and when the depth is 200 m-300 m, the slope angle is between 36° and 43°. In some other embodiments, the slope angle may also be determined by further combining the structural conditions, hydrogeological conditions, etc. in the exploration region.

One or more embodiments involved in the above test will be described in more detail below by taking a mining value evaluation of SM121 leucogranite-hosted uranium deposit in the southwest of the Rössing Mine in Namibia as an example.

First, the uranium resource amount of the SM121 deposit exceeds 10000 t, and the scale is super large. The first sampling point locations are set at a density of one sample section of 1 meter to systematically collect samples, and a total of 2132 samples are collected. The samples are subjected to a non-contamination crushing processing to 200 mesh, and then a geochemical analysis is performed to each sample. The analysis elements include $U_3O_8$, Nb and Ta. Referring to Table 1 below for the analysis results.

TABLE 1

Partial geochemical analysis results of the SM121 deposit

| Sample Number | $U_3O_8$ (ppm) | Ta (ppm) | Nb (ppm) |
|---|---|---|---|
| A1WRC-001 | 183.93 | 5 | 49 |
| A1WRC-002 | 319.18 | 5 | 22 |
| A1WRC-003 | 89.56 | 5 | 5 |
| A1WRC-004 | 82.17 | 5 | 30 |
| A1WRC-005 | 102.86 | 5 | 10 |
| A1WRC-006 | 173.01 | 5 | 5 |
| A1WRC-007 | 126.34 | 5 | 5 |
| A1WRC-008 | 208.06 | 5 | 5 |
| A1WRC-009 | 119.80 | 10 | 14 |
| A1WRC-010 | 87.69 | 5 | 46 |
| A1WRC-011 | 101.61 | 5 | 32 |
| A1WRC-012 | 82.65 | 5 | 11 |
| A1WRC-013 | 141.52 | 5 | 22 |
| A1WRC-014 | 111.83 | 10 | 26 |
| A1WRC-015 | 102.90 | 12 | 51 |
| A1WRC-016 | 89.18 | 5 | 12 |
| A1WRC-017 | 134.24 | 5 | 48 |
| A1WRC-018 | 269.63 | 5 | 15 |
| A1WRC-019 | 114.56 | 5 | 28 |
| A1WRC-020 | 185.51 | 5 | 13 |
| A1WRC-021 | 129.99 | 5 | 5 |
| A1WRC-022 | 80.23 | 5 | 5 |
| A1WRC-023 | 212.44 | 5 | 5 |
| A1WRC-024 | 90.62 | 5 | 13 |
| A1WRC-025 | 228.89 | 5 | 5 |
| A1WRC-026 | 1919.81 | 5 | 5 |
| A1WRC-027 | 625.00 | 5 | 5 |
| A1WRC-028 | 105.54 | 5 | 5 |
| A1WRC-029 | 146.86 | 5 | 5 |
| A1WRC-030 | 354.75 | 5 | 5 |
| A1WRC-031 | 313.43 | 5 | 5 |
| A1WRC-032 | 368.01 | 5 | 5 |
| A1WRC-033 | 286.97 | 5 | 11 |
| A1WRC-034 | 407.06 | 5 | 10 |
| A1WRC-035 | 208.43 | 5 | 12 |
| A1WRC-036 | 313.73 | 5 | 10 |
| A1WRC-037 | 286.59 | 5 | 5 |
| A1WRC-038 | 296.49 | 5 | 5 |
| A1WRC-039 | 180.25 | 5 | 5 |
| A1WRC-040 | 100.75 | 5 | 5 |
| A1WRC-041 | 149.151 | 5 | 29 |
| A1WRC-042 | 138.218 | 5 | 15 |
| A1WRC-043 | 238.518 | 5 | 16 |
| A1WRC-044 | 600.02 | 5 | 11 |
| A1WRC-045 | 188.207 | 12 | 14 |
| A1WRC-046 | 547.775 | 5 | 15 |
| A1WRC-047 | 171.128 | 18 | 15 |
| A1WRC-048 | 117.636 | 17 | 17 |
| A1WRC-049 | 97.349 | 5 | 14 |
| A1WRC-050 | 81.355 | 5 | 10 |
| A1WRC-051 | 89.205 | 5 | 12 |
| A1WRC-052 | 112.428 | 5 | 11 |
| A1WRC-053 | 96.424 | 14 | 11 |
| A1WRC-054 | 121.297 | 5 | 10 |
| A1WRC-055 | 147.765 | 5 | 12 |
| A1WRC-056 | 194.389 | 5 | 11 |
| A1WRC-057 | 87.627 | 5 | 10 |
| A1WRC-058 | 80.972 | 5 | 18 |
| A1WRC-059 | 88.191 | 5 | 11 |
| A1WRC-060 | 136.835 | 5 | 5 |

In this embodiment, the first preset value is set to be 100 ppm. The average uranium grade of the SM121 leucogranite-hosted uranium deposit is determined to be $U_3O_{8ave}$=216 ppm by calculation based on the data in Table 1, which is greater than the first preset value. Meanwhile, based on the data in Table 1, the average niobium content is also calculated to be 14 ppm, and the average tantalum content is 6 ppm.

Next, second sampling point locations are set to collect samples to determine the uranium occurrence. As the uranium resource amount of the SM121 leucogranite-hosted uranium deposit exceeds 10000 t, 120 second sampling point locations are set. The samples collected at the second sampling point locations are made into polished thin sections of about 0.3 mm, and subjected to rock and mineral identification, radiography and electron probe analysis. In this embodiment, the second preset value is 60%. The above analysis results show that the proportion of uranium whose uranium occurrence is uraninite and uranophane is 90%, which is greater than the second preset value.

Next, 500 kg of uranium ore samples are collected and divided into 10 sets for hydrometallurgy test, each batch of samples is about 50 kg, and the final results are shown in Table 2 below.

TABLE 2

Hydrometallurgy test results of the SM121 deposit

| Batch | Processing Amount (kg) | Grade (kg/t) | Total Uranium Amount (g) | Uranium Recovery Amount (g) | Recovery Rate (%) |
|---|---|---|---|---|---|
| 1 | 48 | 0.374 | 17.95 | 14.76 | 82.2 |
| 2 | 51 | 0.283 | 14.43 | 11.99 | 83.1 |
| 3 | 49 | 0.35 | 17.15 | 14.15 | 82.5 |
| 4 | 51 | 0.269 | 13.72 | 11.40 | 83.1 |
| 5 | 53 | 0.39 | 20.67 | 17.51 | 84.7 |
| 6 | 48 | 0.187 | 8.98 | 7.68 | 85.6 |
| 7 | 50 | 0.277 | 13.85 | 11.94 | 86.2 |
| 8 | 52 | 0.347 | 18.04 | 15.68 | 86.9 |
| 9 | 51 | 0.2 | 10.20 | 8.28 | 81.2 |
| 10 | 47 | 0.168 | 7.90 | 6.25 | 79.1 |

Based on the above table, the uranium recovery rate is between 79.1% and 86.9%, mostly below 85%, and the average uranium recovery rate is 83.5%. In this embodiment, the third preset value is 75%, and the average uranium recovery rate is greater than the third preset value.

Next, the uranium ore amount of SM121 is calculated to be 7162863 it, the amount of rock to be stripped is 118903527 t, and the uranium stripping ratio $n_p$=1.66. In this embodiment, the fourth preset value is 5, and the uranium stripping ratio is less than the fourth preset value.

Based on the above results, the average uranium grade of the deposit is 216 ppm, which is greater than the first preset value, the proportion of uranium whose uranium occurrence is uraninite and uranophane is 90%, which is greater than the second preset value, the average uranium recovery rate is 83.5%, which is greater than the third preset value, and the uranium stripping ratio is 1.66, which is less than the fourth preset value. Therefore, it is comprehensively assessed that the uranium deposit has a mining value. Meanwhile, in this embodiment, the fifth preset value is 100 ppm, while the average niobium content is 14 ppm and the average tantalum content is 6 ppm, which are both less than the fifth preset value. Therefore, niobium and tantalum have no value for mining as associated resources.

The present disclosure has been described in detail above in combination with the accompanying drawings and embodiments, but the present disclosure is not limited to the above embodiments. Within the scope of knowledge possessed by those skilled in the art, various modifications may be made without departing from the objectives of the present disclosure.

What is claimed is:

1. A method for determining a mining value of a leucogranite-hosted uranium deposit, comprising:
determining average uranium grade, uranium occurrence, average uranium recovery rate and uranium stripping ratio of a leucogranite-hosted uranium deposit in an exploration region, wherein the average uranium recovery rate is a ratio of a uranium recovery amount after hydrometallurgy to a total uranium amount, and the uranium stripping ratio is a ratio of an amount of rock to be stripped to a uranium ore amount in a mining process; and
determining a mining value of the leucogranite-hosted uranium deposit in the exploration region, wherein the mining value of the leucogranite-hosted uranium deposit is determined based on one or more of the average uranium grade, the uranium occurrence, the average uranium recovery rate, and the uranium stripping ratio,
wherein the determining a mining value of the leucogranite-hosted uranium deposit in the exploration region comprises:
determining that the leucogranite-hosted uranium deposit has a mining value, if following conditions are satisfied: the average uranium grade being greater than the first preset value, a proportion of a uranium whose uranium occurrence is uraninite and uranophane being greater than the second preset value, the average uranium recovery rate being greater than the third preset value, and the uranium stripping ratio being less than or equal to the fourth preset value
wherein the method further comprises:
determining an average niobium content and/or an average tantalum content of the leucogranite-hosted uranium deposit in the exploration region;
wherein the determining a mining value of the leucogranite-hosted uranium deposit in the exploration region further comprises:
determining that niobium and/or tantalum in the leucogranite-hosted uranium deposit has a value for mining as an associated resource, if it is determined that the leucogranite-hosted uranium deposit has a mining value and the average niobium content and/or the average tantalum content is greater than a fifth preset value;
wherein the method further comprises:
mining the niobium and/or tantalum together with the uranium in the leucogranite-hosted uranium deposit, so as to maximize the utilization of resources.

2. The method according to claim 1, wherein the determining a mining value of the leucogranite-hosted uranium deposit in the exploration region comprises:
determining that the leucogranite-hosted uranium deposit has no mining value, if it is determined that the average uranium grade is less than or equal to a first preset value.

3. The method according to claim 1, wherein the determining a mining value of the leucogranite-hosted uranium deposit in the exploration region comprises:
determining that the leucogranite-hosted uranium deposit currently has no mining value, but is capable of being used as a reserve resource, if it is determined that the average uranium grade is greater than a first preset value, and at least one of the following is determined:
a proportion of a uranium whose uranium occurrence is betafite and brannerite being greater than a second preset value, the average uranium recovery rate being less than or equal to a third preset value, and the uranium stripping ratio being greater than a fourth preset value.

4. The method according to claim 1, wherein the determining average uranium grade, uranium occurrence, average uranium recovery rate, and uranium stripping ratio of the leucogranite-hosted uranium deposit in the exploration region comprises:

determining the average uranium grade, the uranium occurrence, the average uranium recovery rate and the uranium stripping ratio in sequence.

5. The method according to claim 1, wherein the determining a mining value of the leucogranite-hosted uranium deposit in the exploration region further comprises:

determining, after it is determined that the leucogranite-hosted uranium deposit in the exploration region has a mining value, a size of the mining value of the leucogranite-hosted uranium deposit in the exploration region based on one or more of the average uranium grade, the average uranium recovery rate, and the uranium stripping ratio, wherein the size of the mining value is in proportion to the average uranium grade and the average uranium recovery rate, and is in inverse proportion to the uranium stripping ratio.

6. The method of according to claim 1, wherein the determining average uranium grade comprises:

setting a plurality of first sampling point locations in the exploration region, wherein the number of the first sampling point locations is related to a scale of the leucogranite-hosted uranium deposit;

determining a uranium grade at each of the first sampling point locations respectively; and determining an average value of the uranium grade at the plurality of the first sampling point locations as the average uranium grade.

7. The method according to claim 1, wherein the determining uranium occurrence comprises:

setting a plurality of second sampling point locations in the exploration region, wherein the number of the second sampling points is related to a scale of the leucogranite-hosted uranium deposit;

determining uranium occurrence at each of the second sampling point locations respectively; and determining a proportion of a uranium in each uranium occurrence based on a ratio of the number of the second sampling point locations corresponding to each uranium occurrence to a total number of the second sampling point locations.

8. The method according to claim 1, wherein the determining average uranium recovery rate comprises:

collecting a plurality of sets of core samples in the exploration region;

determining a total uranium amount of each set of the core samples based on a weight and a uranium grade of each set of the core samples respectively, and determining a uranium recovery amount of each set of the core samples by performing hydrometallurgy to each set of the core samples respectively, so as to calculate a uranium recovery rate of each set of the core samples; and determining an average value of uranium recovery rates of the plurality of sets of core samples as the average uranium recovery rate.

9. The method according to claim 8, wherein the collecting a plurality of sets of core samples in the exploration region comprises:

collecting the plurality of sets of core samples at different locations in the exploration region.

10. The method according to claim 1, wherein the determining uranium stripping ratio comprises:

determining a mining region in the exploration region;

determining a uranium ore volume and a surrounding rock volume in the mining region, wherein the surrounding rock volume is determined based on a difference value between a volume of the mining region and the uranium ore volume;

determining the uranium ore amount based on the uranium ore volume and a uranium ore density, and determining the amount of rock to be stripped based on the surrounding rock volume and a surrounding rock density, so as to calculate the uranium stripping ratio.

11. The method according to claim 10, wherein the determining a mining region in the exploration region comprises:

determining a depth of the mining region based on a deposit depth of the leucogranite-hosted uranium deposit;

determining a bottom boundary of the mining region based on a deposit width of the leucogranite-hosted uranium deposit; and determining a slope angle of the mining region based on the depth of the mining region and a mechanical property of the leucogranite-hosted uranium deposit.

* * * * *